United States Patent [19]
Mori et al.

[11] Patent Number: 6,123,521
[45] Date of Patent: Sep. 26, 2000

[54] FUEL SUPPLY SYSTEM HAVING A PUMP WITH A RESILIENTLY MOUNTED FILTER

[75] Inventors: Eiji Mori, Toyota; Masahide Kobayashi, Aichi-ken; Takashi Nagai; Satomi Wada, both of Obu; Kouji Izutani, Nagoya; Keiichi Yamashita, Kariya; Hideyuki Nakai, Obu; Kingo Okada, Toyohashi; Kazuhiro Shinomiya, Aichi-ken, all of Japan

[73] Assignees: Toyota Jidosha Kabushiki Kaisha, Toyota; AISAN Industry Co., Ltd., Obu; Denso Corporation, Kariya, all of Japan

[21] Appl. No.: 09/086,474

[22] Filed: May 28, 1998

[30] Foreign Application Priority Data

May 30, 1997 [JP] Japan ................................. 9-142439

[51] Int. Cl.[7] .................................................. F04B 35/04
[52] U.S. Cl. ................................... 417/423.3; 417/423.9; 417/423.14
[58] Field of Search ............................... 417/313, 423.3, 417/423.14, 423.9; 123/509, 510

[56] References Cited

U.S. PATENT DOCUMENTS

| | | |
|---|---|---|
| 5,046,471 | 9/1991 | Schmid ................................. 123/510 |
| 5,392,750 | 2/1995 | Laue et al. . |
| 5,647,330 | 7/1997 | Sawert et al. . |
| 5,758,627 | 6/1998 | Minagawa et al. ..................... 417/313 |
| 5,769,061 | 6/1998 | Nagata et al. ......................... 123/509 |

FOREIGN PATENT DOCUMENTS

| | | |
|---|---|---|
| WO96/23966 | 8/1996 | Japan . |
| WO96/23967 | 8/1996 | Japan . |
| 9-32672 | 2/1997 | Japan . |
| 9-32679 | 2/1997 | Japan . |

*Primary Examiner*—Charles G. Freay
*Attorney, Agent, or Firm*—Oliff & Berridge, PLC

[57] ABSTRACT

A fuel supply system having a pump for drawing and discharging fuel from a tank and a filter for catching foreign matter in the fuel. A housing has a fuel outlet and supports the pump. The pump has a fuel intake port and a fuel discharge port. A fuel passage is located in the housing and connects the fuel outlet with the discharge port The filter is located in the fuel passage. The filter has a filter case and a filter element therein. The filter case is located in the housing spaced from the inner wall thereof.

20 Claims, 3 Drawing Sheets

FUEL SUPPLY SYSTEM HAVING A PUMP WITH A RESILIENTLY MOUNTED FILTER

BACKGROUND OF THE INVENTION

The present invention relates to a fuel supply system for internal combustion engines, and more particularly, to a fuel supply system that has a pump for drawing in and discharging fuel from a tank, and a filter for catching foreign substances in the fuel.

Generally, internal combustion engines have injectors in the air intake passage. The fuel from the injectors and the air flowing through the air intake passage are mixed. Then, the mixed air is burned in the combustion chambers to produce driving power. Accordingly, internal combustion engines have a fuel supply system (fuel supplier) for the injectors.

The fuel supplier includes a fuel reservoir tank, a fuel suction pump, and a fuel supply passage from the pump to the injector, filter is usually provided in the fuel supply passage to catch foreign substances in the fuel, because the injectors can be clogged when fuel containing foreign substances is supplied to the injectors.

International Publication Number WO96/23967 describes such a fuel supplier. In the fuel supplier shown in FIGS. 4 and 5, a pump 110 and a filter 120 are assembled integrally to a lid 104 enclosing an opening 102 of a tank 100.

A lower housing 126 of the filter 120 is fixed under the lid 104. As shown in FIG. 5, the lower housing 126 is C-shaped and accommodates a filter element 124 in its internal space 123. An inset pipe 134 is integrally formed on the upper internal surface of the lower housing 126 and is connected to a discharging conduit 112 of the pump 110.

An upper space 160 and a lower space 162 are formed on the upper and lower portion of the filter element 124 in the internal space 123. The fuel discharged from the discharge conduit 112 flows into the upper space 160 through the inlet pipe 134. On the other hand, the lower space 162 is connected to a discharge duct 132 on the lid 104 by way of a duct 136.

The fuel that has flowed into the upper space 160 from the pump 110 then flows into the lower apace 162 through the filter element 124. Foreign matter in the fuel is caught by the filter element 124 The fuel in the lower space 162 is supplied to the injectors of the engine (not shown) through the ducts 136 and 132.

The pump 110 usually has an electric motor and an impeller fixed on the drive shaft of the motor (both not shown). The rotation of the impeller discharges the fuel. The pressure of the discharged fuel fluctuates continually. For this reason, when the fuel goes through the space 123, the lower housing 126 vibrates due to the pressure pulsation of the fuel. The vibration and noise are transmitted outside through the housing 126 and the lid 104.

SUMMARY OF THE INVENTION

Accordingly, it is an objective of the present invention to provide a fuel supplier that produces less vibration and noise.

To achieve the above objection, the present invention provides a fuel supply apparatus having a pump for drawing and discharging fuel from a tank and a filter for filtering out foreign matter from the fuel. The apparatus includes a housing for supporting the pump, the housing having an inner wall and a fuel outlet. The pump has a suction port for drawing the fuel and discharge port for discharging the fuel. A fuel passage is provided within the housing for connecting the fuel outlet to the discharge port. The filter is located in the fuel passage. The filter includes a filter case and a filter element located within the filter case. The filter case is located within the housing to be apart from the inner wall of the housing by a predetermined distance.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A fuel supplier for fuel injectors for gasoline vehicle engines will now be described by reference to FIGS. 1 to 3.

Figure 1:
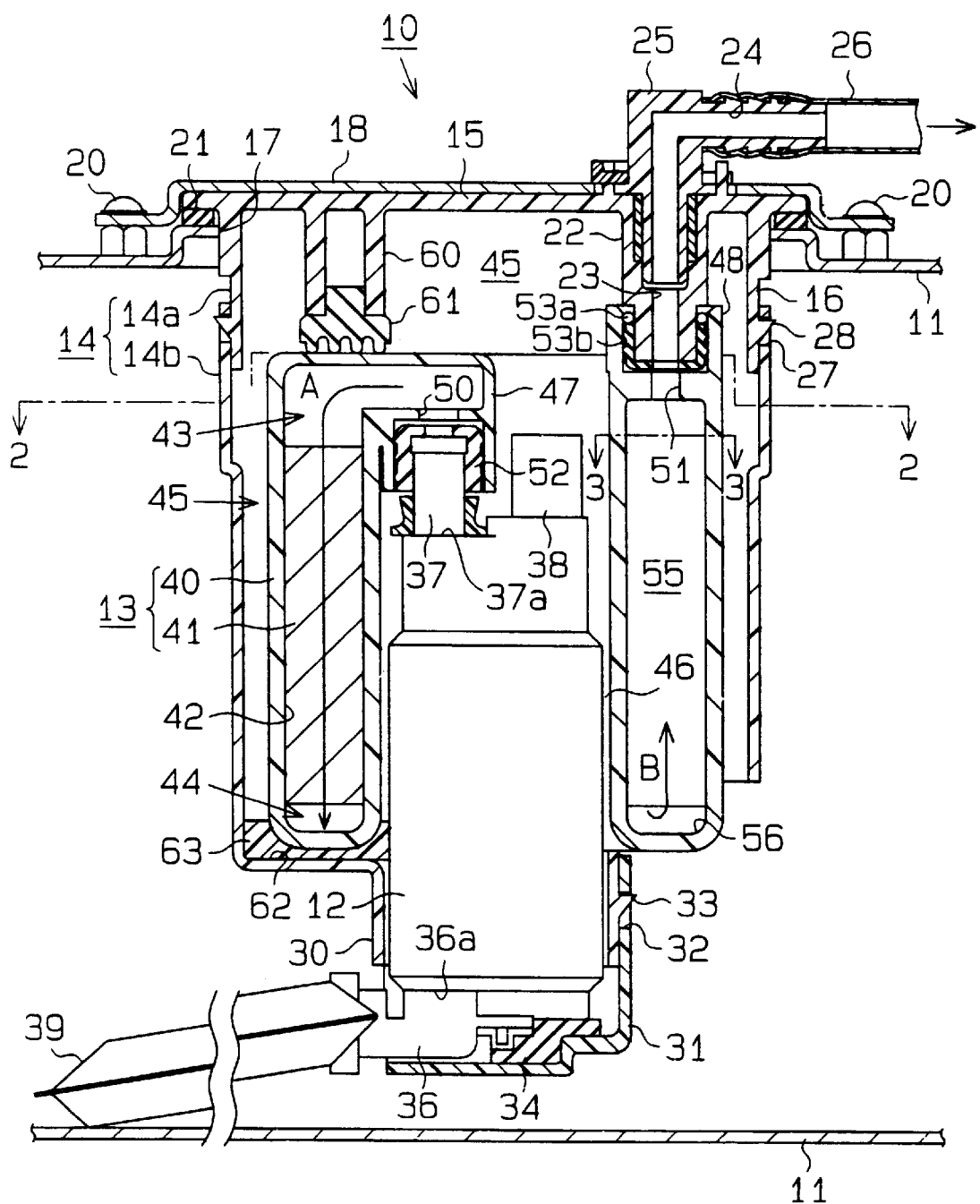
FIG. 1 is a sectional view showing a fuel supplier in an embodiment according to the present invention.

As shown in FIG. 1, a fuel supplier 10 includes a pump 12 for drawing in and discharging the fuel in a tank 11, a filter 13 for catching foreign matter in the fuel, and a housing 14 for supporting the pump 12 and the filter 13 in the tank 11. The pump 12 has a generally columnar shape.

The housing 14 is made of resin material and includes the upper housing 14a and the lower housing 14b. The upper housing 14a includes a disc portion 15 and a cylinder portion 16. The cylinder portion 16 is inserted in the tank 11 through a circular hole 17 formed on the tank 11.

The disk portion 15 is installed on the tank 11 by a fixing plate 18 to cover the hole 17. The fixing plate 18 is bolted by bolts 20, which are located on the periphery of the plate 18. A seal ring or gasket 21, is located between the disk portion 15 and the tank 11 to seal about the hole 17.

A downwardly extending fitting 22 is formed integrally on the disk portion 15. A through hole 23 having a step is formed inside the fitting 22. The lower portion of a fuel supply pipe 25 is inserted and fixed in the upper portion of the through hole 23. The fuel supply pipe 25 has an internal L-shaped passage 24. The upper portion of the fuel supply pipe 25 is connected to a delivery pipe (not shown) of the engine (not shown) by way of a hose 26. The fuel in the delivery pipe is distributed to injectors installed to the delivery pipe.

The lower housing 14b is generally cylindrical. The cylinder portion 16 of the upper housing 14a is inserted in an upper opening of the lower housing 14b. Apertures 27 are formed on the upper portion of the lower housing 14b. Flexible lock fingers 28 are formed on the lower portion of the cylinder portion 16. The lower housing 14b is detachably engaged with the upper housing 14a by snap-fitting each finger 28 to the corresponding aperture 27.

A generally cylindrical holding portion 30 is integrally formed on the lower portion of the lower housing 14b. A bracket 31 made of resin material is attached on the holding portion 30. The bracket 31 is detachably installed on the holding portion 30 by snap-fitting apertures 32 of the bracket 31 to flexible lock fingers 33 of the holding portion 30. The lower portion of the pump 12 is inserted in the holding portion 30 and is supported by the bracket 31. In this configuration, the pump 12 is not in direct contact with the bracket 31. That is, a supporter 34 is fixed to the bracket 31 and is interposed between the lower portion of the pump 12 and the bracket 31. Fuel-resistant rubber is employed as the rubber material for the supporter 34 in this embodiment.

A fuel intake port 36a is located on the lower portion of the pump 12, and a discharge port 37a is located on the upper portion. Furthermore, the pump 12 has an intake pipe 36, a discharge pipe 37, a terminal 38, and an electric motor (not shown). The intake pipe 36 is connected to the intake port 36a and extends laterally. The discharge pipe 37 is connected to the discharge port 37a and extends upward.

A strainer 39 is attached to the intake pipe 36. When the fuel in the tank 11 is drawn in through the intake pipe 36, the strainer 39 blocks relatively large foreign particles. A disk-like impeller having grooves on its periphery (not shown) is connected to the electric motor. Furthermore, the electric motor is connected to a battery and a controller (both not shown), which are provided outside the tank 11, by lead wires (not shown).

In the pump 12, the electric motor rotates the impeller in accordance with the voltage applied by the controller The fuel in the tank 11 is drawn in from the intake pipe 36 through the strainer 39 and is discharged through the discharge pipe 37 at a predetermined discharge pressure.

When the tank 11 contains fuel, the pump 12 and the lower portion of the lower housing 14b are immersed in the fuel.

The filter 13 is provided in the lower housing 14b. As shown in FIG. 2, the filter 13 includes a filter case 40, which has a C-shaped section, and a filter element 41.

The filter case 40 is electrically conductive and made of material that contains resin material mixed with carbon fiber or conductive material such as carbon powder. The fuel discharged from the pump 12 flows through the filter element 41 accommodated in the filter case 40, and friction between the fuel and the element 41 generates a negative electric charge in the element 41. However, the filter case 40 is conductive and the electric charge in the element is discharged outside, thus preventing the accumulation or an electric charge in the element 41.

A filter chamber 42 is formed in the filter case 40 for accommodating the filter element 41. An upper passage 43 and lower passage 44 are formed respectively at the upper and lower sides of the element 41 in the filter chamber 42.

A space 45 connected to the tank 11 is formed between the filter case 40 and the housing 14. An arcuate space 46 is formed between the inner side of the filter case 40 and the pump 12, which is also connected to the tank 11. Accordingly, these spaces 45 and 46 are usually filled with the fuel.

An inlet pipe 47 and outlet pipe 48 are integrally formed on the filter case 40, respectively. The vices 47, 48 have stepped bores 50 and 51, respectively. The inlet pipe 47 is connected to the fuel discharge pipe 37. The outlet pipe 48 is connected to the lower portion of the fitting 22.

The inlet pipe 47 and the fuel discharge pipe 37 are not in direct contact with each other, that is, the fuel discharge pipe 37 is covered with a gasket, or cap 52 made of fuel-resistant rubber. The inlet pipe 47 is detachably fitted on the cap 52 to connect the members 37 and 47.

The outlet pipe 48 is also not in direct contact with the joint 22. That is, an O ring 53a and a gasket, or cap 53b, both made of rubber, are attached to the lower potion of the fitting 22. The outlet pipe 48 is detachably fitted to the members 53a, 53b to connect the fitting 22 and the pipe 47.

Figure 3:
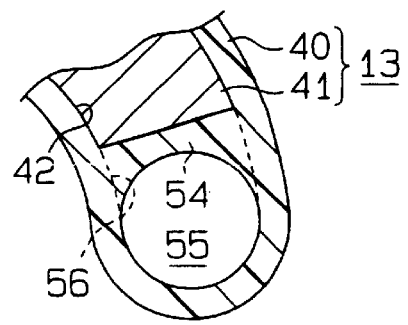
FIG. 3 is a sectional view taken on line 3—3 of FIG. 1.

As shown in FIG. 3, an internal passage 55 is partitioned by a wall 54 in the filter case 40. The upper portion of the passage 55 is connected to the outlet pipe 48, and the lower portion is connected to a lower passage 44 through a communication passage 56 formed under the wall 54.

A support leg 60 is formed on the disk portion 15 and extends downward. A foot 61, which is made of fuel-resistant rubber NBR (acrylonitrile butadiene copolymer), is fixed to the lower portion of the support leg 60. A concave retainer 63 made of NBR is also fixed on a step 62 of the lower housing 14b. The foot 61 contacts the top of the inlet pipe 47, and the retainer 63 holds the bottom of the filter case 40. Accordingly, the filter case is supported by the housing 14 at three points: its bottom, the inlet pipe 47, and the outlet pipe 48, with no direct contact with the housing 14. The retainer 63 is also in contact with the side of the pump 12 as shown in FIG. 1.

Figure 2:
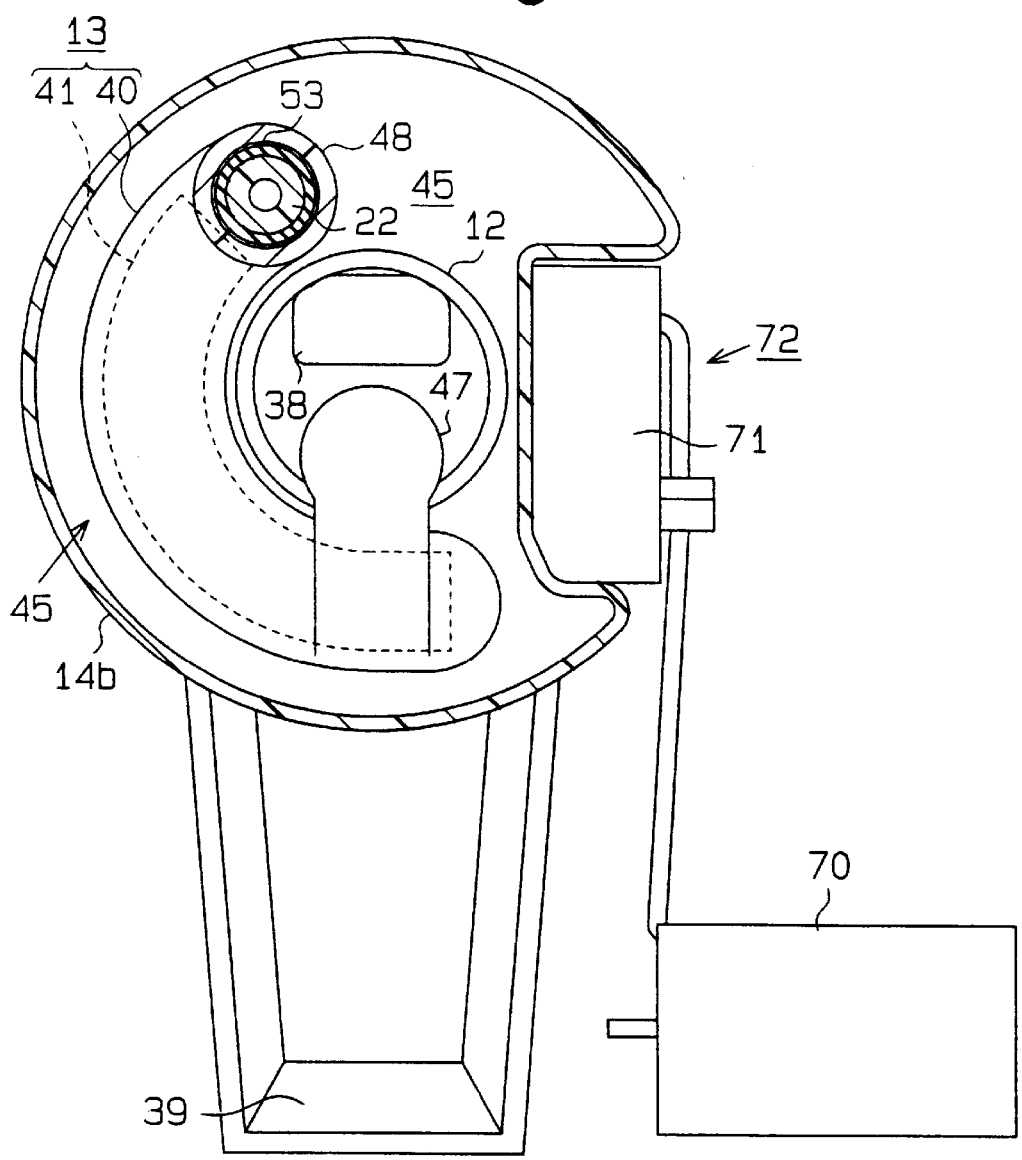
FIG. 2 is a sectional view taken on line 2—2 of FIG. 1.

As shown in FIG. 2, a level gauge 72 having a float 70 and a sensor 71 is provided outside the lower housing 14b. The level gage 72 detects the left fuel amount. A pressure regulator (not shown) is provided in the lower housing 14b. The pressure regulator returns some fuel to the tank 11 when the fuel pressure in the lower passage 44 goes higher than a predetermined value. A connector (not shown) is formed integrally on the upper housing 14a to electrically connect the terminal 38, the level gauge 72, and the controller.

The fuel flow from the tank 11 to the delivery pipe will now be described.

When the pump 12 is operated, the fuel in the tank 11 is drawn into the pump 12 through the strainer 39 and the intake pipe 36 and is discharged through the discharge pipe 37. Then, the fuel flows into the upper passage 43 through the bore 50 of the inlet pipe 47. As shown by an arrow A in FIG. 1, the fuel in the upper passage 43 flows into the lower passage 44 through the filter element 41 in the filter chamber 42 and then flows into the passage 55 through the communication passage 56. Foreign matter in the fuel is caught by the filter element 41.

As shown by an arrow B in FIG. 1, the fuel then flows upward through the passage 55. The fuel then flows into the hose 26 through the passage 24 of the supply pipe 25 and is then supplied to the delivery pipe.

As explained above, the fuel from the pump 12 goes through the filter case 40, that is, the upper passage 43, the filter chamber 42, the lower passage 44, the communication passage 56, and the passage 55. When the fuel goes through the filter case 40, the pressure pulsation of the fuel discharged from the pump 12 causes vibration. If the vitiation of the filter case 40 were transmitted to the housing 14, it would generate vibration and noise outside, especially through the disk 15 of the upper housing 14a, which is exposed to the exterior.

In this embodiment, the filter case 40 and the housing 14 are independent, and the filter case 40 is accommodated in the housing 14 with a space 45 between the case 40 and the housing 14. This prevents the transmission of vibration from the filter case 40 to the housing 14. When vibration is transmitted to the fuel, it is reduced, or dampened by the fuel. Therefore, in the fuel supplier 10 of this embodiment, the vibration and noise of the housing 14 is reduced.

Furthermore, in this embodiment, the filter case 40 is not in direct contact with the housing 14. Elastomeric supporting elements, that is, the foot 61, the retainer 63, and the cap 53b, are located between the case 40 and the housing 14. Accordingly, most of the vibration energy of the filter came 40 is converted into heat energy generated by the elastic deformation of the cap 53b, the foot 61, and the retainer 63.

As a result, vibration transmitted from the filter case 40 to the housing 14 is reduced, thus restraining the vibration and the noise of the housing 14. The amount of vibration energy converted to heat energy can be maximized by varying the elastic modulus and the damping rate of the supporting elements 61, 63, in accordance with the material quality and the shape of the elements 61, 63.

Vibration of the filter case 40 can also be caused by vibration of the pump 12 itself, in addition to the pressure pulsation of the fuel. In this embodiment, the inlet pipe 47 of the filter case 40 and the fuel discharge pipe 37 of the pump 12 are not in direct contact with each other, since the cap 52 separates them. Accordingly, most of the vibration energy of the pump 12 is converted to heat energy by the deformation of the cap 52. This minimizes the vibration transmitted to the filter case 40.

Furthermore, in this embodiment, the arcuate space 46 is formed between the inner side of the filter case 40 and the pump 12. The vibration transmitted to the filter case 40 is very small, since the fuel in the space 46 acts as a damper.

Still further, the retainer 63 contacts the side of the pump 12, in addition to supporting the filter case 40. Accordingly, the position of the pump 12 relative to the filter case 40 is set by the retainer 63 to form the apace is 46. As a result, the pump 12 and the filter case 40 are not in direct contact with each other, thus reducing the transmission of vibration from the pump 12 to the filter case 40.

As described above, the vibration and noise transmitted outward from the fuel supplier 10 or this embodiment is reduced by suppressing the vibration of the filter case 40 itself and the housing 14.

Furthermore, the elastomeric supporter 34 is located between the bottom of the pump 12 and the bracket 31. This reduces the transmission of vibration from the pump 12 itself to the housing 14, which further reduces vibration and note of the housing 14.

Further, in this embodiment, the filter came 40, which is required to be sealed and pressurized, and the housing 14b, which fixes the filter case 40 and the pump 12 to the tank 11, are independent. Accordingly, there is no need to pressurize and seal the housing 14. As a result, in this embodiment, there is no need to strengthen the assembly between the upper housing 14a and the lower housing 14b to form a seal. It is also not necessary to provide a seal ring between the members 14a and 14b.

Figure 4:
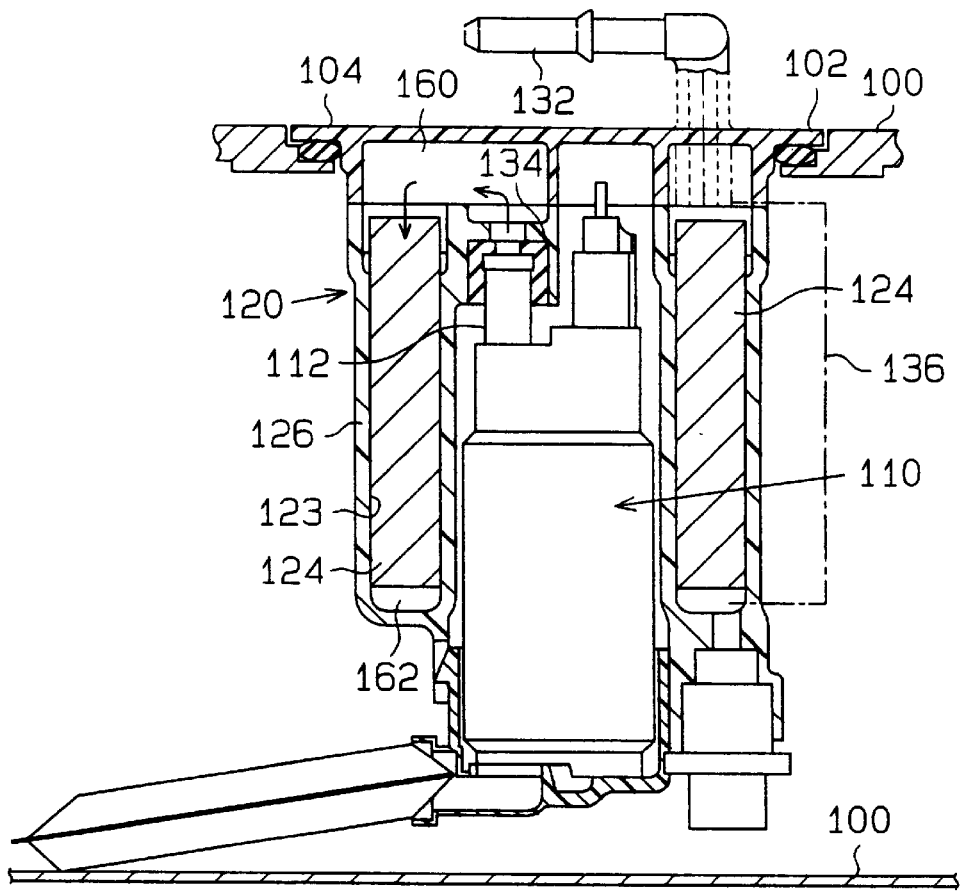
FIG. 4 is a sectional view showing a conventional fuel supplier.

In the prior art as shown in FIG. 4, the space 123 that accommodates the filter element 55 is formed in the lower a housing 126, and there is a need to weld the lid 104 (corresponding to the upper housing 14a) to the lower housing 126 (corresponding to the lower housing 14b), so that the fuel cannot leak from the housing 126. However, when the lid 104 and the lower housing 126 are welded to each other, it is difficult to replace the filter element 124, which makes maintenance more costly.

It is also possible to snap-fit the lid 104 of the prior art device to the lower housing 126 without welding, as in the present embodiment. However, in this case, it becomes necessary to increase the assembly strength and to provide a seal between the members 104 and 126 so that a predetermined pressure can be maintained inside the housing 126.

In the present embodiment, there is no need to weld the lower housing 14b to the upper housing 14a, and the lower housing 14b is detachably fitted to the upper housing 14a without a costly sealed coupling. Furthermore, since the filter case 40 is detachable from the pump 12 and the housing 14a, the filter element 41 is easily replaced together with the filter case 40 by detaching the upper housing 14a from the lower housing 14b and then detaching the filter case 40 from the pump 12. This improves maintenance and lowers costs.

Further, in this embodiment, since the filter case 40 of the filter 13 and the housing 14 are independent, the filter 13 may be used in other types of fuel suppliers, for example, chose with different pumps. This permits common parts to be used and lowers the total manufacturing costs of the fuel supplier 10.

The fingers 28 of the upper housing 14a are snap-fitted to the apertures 27 of the lower housing 14b, to make the lower housing 14b detachable from the upper housing 14a. This snap-coupling facilitates the attachment and detachment of the housing 14a and 14b. This permits some slight updown movement of the lower housing 14b with respect to the upper housing 14a. However, in this embodiment, the foot 61, the filter case 40, and the retainer 63 are located between the upper housing 14a and the lower housing 14b, 80 that the upper housing 14a and the lower housing 14b are constantly urged away from each other (in the vertical direction in FIG. 1) by the compression reaction force of the lactomeric elements 61, 62. Accordingly, rattling between the housing parts 14a, 14b is prevented.

Figure 5:
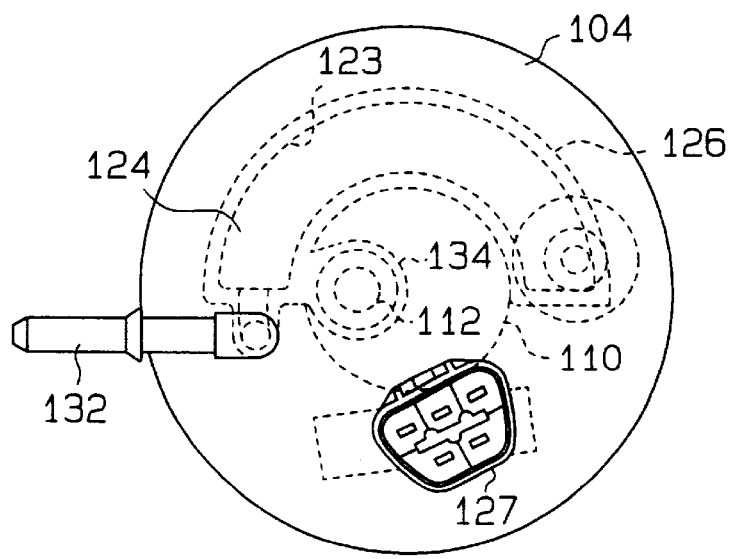
FIG. 5 is a plan view showing the fuel supplier of FIG. 1.

As mentioned already, the filter case 40 must be conductive to prevent the accumulation of electric charge in the filter element 41. Accordingly, in the prior art shown in FIG. 4, it is necessary to make the lower housing, which accommodates the filter element 124, with conductive resin. On the other hand, the lid 104 is preferably formed by non-conductive resin, because the lid 104 has to integrally form the electric connector 127 as shown in FIG. 5. In the prior art, the lid 104 is welded to the lower housing 126 to ensure sealing.

However, when the lid 104 and the lower housing 126 are formed by different kinds of resin materials, stress is generated by the thermal expansion difference between these materials. This lowers the durability of the fuel supplier. In this embodiment, since the filter case 40 and the housing 14 are independent, there is no need to weld different types of resin materials together as in the prior art. Accordingly, this problem is avoided.

The summarized advantages of this embodiment will be listed below.

The vibration and noise of the fuel supplier 10 is reduced.

The lower housing 14b is detachable with respect to the upper housing 14a without a costly sealed coupling.

The filter element is easily replaced together with the filter case 40, thus facilitating maintenance.

The manufacturing cost of fuel supplier 10 is lowered by permitting the use of common parts.

Rattling of the lower housing 14b, which usually occurs when snap-fitting is employed, is prevented.

The durability of the fuel supplier 10 is improved.

The above embodiment may be varied as follows, while keeping substantially the same advantages.

In the illustrated embodiment the elastomeric elements 61, 63 are made of NBR rubber, however, other rubber material such as highly saturated nitrile rubber may be also employed, as long as it is fuel-resistant. Instead of rubber materials, leaf springs and coil springs may be employed for the elements 34, 61, and 63.

In the illustrated embodiment, the fuel supplier 10 is provided in the tank 10, however, the fuel supplier 10 may also be provided outside the tank 11.

The present examples and embodiments are to be considered as illustrative and not restrictive and the invention is not to be limited to the details given herein, but may be modified within the scope and equivalence of the appended claims.

What is claimed is:

1. A fuel supply apparatus having a pump for drawing and discharging fuel from a tank and a filter for filtering foreign particles from the fuel, the apparatus comprising:

a housing for supporting the pump, the housing having an inner wall and a fuel outlet, wherein the pump has a suction port for drawing the fuel and a discharge port for discharging the fuel;

a fuel passage provided within the housing for connecting the fuel outlet to the discharge port, wherein the filter is located in the fuel passage;

wherein the filter includes a filter case and a filter element located within the filter case, the filter case being located within the housing and separated from the inner wall of the housing by a predetermined distance; and a resilient member located between the filter case and the housing.

2. The apparatus according to claim 1, wherein at least part of the housing is immersed in fuel within the tank such that there is fuel between the housing and the filter case when the fuel tank is substantially full.

3. The apparatus according to claim 1, wherein the housing includes a first section and a second section, the second section being detachably connected to the first section.

4. The apparatus according to claim 3, wherein the resilient member is a first resilient member, and a second resilient member is located between the first section of the housing and the filter case.

5. The apparatus according to claim 4 further comprising a bracket mounted on the housing, wherein the bracket supports the pump.

6. The apparatus according to claim 4, wherein the resilient member is a first resilient member and a second resilient member is located between the bracket and the pump.

7. The apparatus according to claim 1, wherein the resilient member is in contact with the pump.

8. The apparatus according to claim 1, wherein the pump has a cylindrical external form and the filter case has a semicylindrical internal form, wherein the filter came is spaced from the pump by a predetermined distance.

9. The apparatus according to claim 8, wherein the pump has a suction conduit connected to the suction port, the suction conduit extending laterally outward from the pump, wherein the pump has a discharge conduit connected to the discharge port, the discharge conduit extending vertically upward from the pump.

10. The apparatus according to claim 9 wherein the resilient member is a first resilient member, and the apparatus further comprises a second resilient member located between the pump and the filter case, wherein the second resilient member holds the discharge conduit.

11. A fuel supply apparatus having a pump for drawing and discharging fuel from a tank and a filter for filtering out foreign particles from the fuel, the apparatus comprising:

a housing for supporting the pump, the housing having an inner wall and a fuel outlet, wherein the pump has a suction port for drawing the fuel and a discharge port for discharging the fuel;

a fuel passage provided within the housing for connecting the fuel outlet to the discharge port, wherein the filter is located in the fuel passage;

wherein the filter includes a filter case and a filter element located within the filter case, the filter case being located within the housing and separated from the inner wall of the housing by a predetermined distance; and a plurality of resilient members interposed between the filter case and the housing.

12. The apparatus according to claim 11, wherein at least part of the housing is immersed in fuel within the tank such that there is fuel between the housing and the filter case when the fuel tank is substantially full.

13. The apparatus according to claim 11, wherein the housing includes a first section and a second section, the second section being detachably connected to the first section.

14. The apparatus according to claim 11, wherein at least one of the resilient members is located between the first section of the housing and the filter case.

15. The apparatus according to claim 12 further comprising a bracket mounted on the housing, wherein the bracket supports the pump.

16. The apparatus according to claim 15, wherein an additional resilient member is located between the bracket and the pump.

17. The apparatus according to claim 11, wherein at least one of the resilient members is in contact with the pump.

18. The apparatus according to claim 11, wherein the pump has a cylindrical external form and the filter case has a semicylindrical internal form, wherein the filter case is spaced from the pump by a predetermined distance.

19. The apparatus according to claim 18, wherein the pump has a auction conduit connected to the suction port, the suction conduit extending laterally outward from the pump, wherein the pump has a discharge conduit connected to the discharge port, the discharge conduit extending vertically upward from the pump.

20. A fuel supply apparatus for installation inside a liquid fuel tank, the fuel supply apparatus comprising:

a pump including a suction port and a discharge port;

a filter including a filter ease and a filter element, wherein the filter receives fuel from the pump, and wherein the pump and the filler are independent components and are separated from one another by elastomeric material to prevent direct contact therebetween;

a housing for supporting the pump and the filter, wherein the housing is separated from the pump by elastomeric material to prevent direct contact between the housing and the pump, and the housing is separated from the filter by elastomeric material to prevent direct contact between the housing and the filter, and wnerein the filter is generally located between the pump and the housing, and the pump, filter and housing are connected to form a unit.

* * * * *

UNITED STATES PATENT AND TRADEMARK OFFICE
CERTIFICATE OF CORRECTION

PATENT NO. : 6,123,521
DATED : September 26, 2000
INVENTOR(S) : Eiji Mori, Masahide Kobayashi, Takashi Nagai, Satomi Wada, Kouji Izutani, Keiichi Yamashita, Hideyuki Nakai, Kingo Okada and Kazuhiro Shinomiya It is certified that error appears in the above-identified patent and that said Letters Patent is hereby corrected as shown below:

Claim 5,
Line 1, change "4" to -- 3, --.

Claim 6,
Line 1, change "4" to -- 5 --.

Claim 19,
Line 2, change "auction" to -- suction --.

Signed and Sealed this

Thirteenth Day of November, 2001

*Attest:*

NICHOLAS P. GODICI
*Attesting Officer*    *Acting Director of the United States Patent and Trademark Office*